United States Patent [19]

Sorensen, Jr.

[11] Patent Number: 4,516,670

[45] Date of Patent: May 14, 1985

[54] MEANS FOR CONTROLLING ROW PLANTERS

[76] Inventor: Edward C. Sorensen, Jr., Rte. 1, Box 5, Prescott, Iowa 50859

[21] Appl. No.: 427,775

[22] Filed: Sep. 29, 1982

[51] Int. Cl.[3] .......................... A01C 5/00; F16D 11/10
[52] U.S. Cl. .................................... 192/48.8; 111/67; 192/67 R; 192/67 P; 192/99 S
[58] Field of Search .............. 192/20, 23, 48.8, 48.9, 192/48.91, 67 R, 82 P, 99 S, 67 P; 111/34, 67

[56] References Cited

U.S. PATENT DOCUMENTS

| | | | |
|---|---|---|---|
| 343,250 | 6/1886 | McCord | 111/34 |
| 520,528 | 5/1894 | Jones | 192/48.9 |
| 1,489,010 | 4/1924 | Roth | 192/48.8 |
| 2,332,743 | 10/1943 | Morris | 111/67 |
| 4,425,857 | 1/1984 | Lienemann et al. | 111/85 |

FOREIGN PATENT DOCUMENTS 274798  6/1930  Italy .................... 192/20

*Primary Examiner*—Rodney H. Bonck
*Attorney, Agent, or Firm*—Zarley, McKee, Thomte, Voorhees & Sease

[57] ABSTRACT

The present device is adapted for use with conventional row planters which have two separate groups of planting devices thereon. The present invention permits each of the planting systems to be separately turned on or off. The planting selector is operated on a gear driven fulcrum bar that is connected at its opposite ends to two levers. Each lever has a fork on one end that engages the clutch mechanism for one of the two planter systems. The gear driven fulcrum bar is driven by an electric motor which is capable of driving the fulcrum bar in a first direction or which is capable of being reversed to drive the fulcrum bar in an opposite direction. The fulcrum bar has three positions. In the middle position, the device will allow the two separate clutches for the two separate planting systems to be engaged so as to activate both planting systems. The two other positions permit one of the planting systems to be deactuated and the other of the planting systems to be activated.

8 Claims, 4 Drawing Figures

MEANS FOR CONTROLLING ROW PLANTERS

BACKGROUND OF THE INVENTION

This invention relates to a method and means for controlling row planters. Conventional multi-row planters in recent years have been capable of planting as many as 8, 12 or even 24 rows at a single pass. In the use of these planters, a problem is often encountered when the farmer reaches the edge of the field which he is planting. If he is using an eight row planter and there are only four rows left to be planted, he has no way of shutting off the remainder of the unneeded planters for the remaining rows.

Some presently known planters include two separate controls for each half of the rows on the planter. One control permits the deactuation of one half of the rows on the planter, and the other control permits the deactuation of the other set of rows on the planter.

However, in order for a farmer to operate these presently known controls to shut off half of the rows on the planter, it is necessary for him to dismount from the tractor and manually shut off the controls. Ths is cumbersome and usually the farmers do not go to the trouble of dismounting from the tractors. Consequently, farmers often double plant several rows at the edge of a field, thereby adding substantially to the cost of seed for planting a field.

Therefore, a primary object of the present invention is the provision of an improved method and means for controlling row planters.

A further object of the present invention is the provision of an improved method and means for controlling row planters wherein the farmer can shut off half of the row planters while leaving the remaining half operable.

A further object of the present invention is the provision of a device which enables the farmer to selectively control the planter without having to dismount from the tractor pulling the planter.

A further object of the present invention is the provision of a control device which can be easily adapted to planters presently known in the art.

A further object of the present invention is the provision of a device which is simple in operation, economical in manufacture, and durable in use.

SUMMARY OF THE INVENTION

The present invention utilizes a pair of levers which are pivotally connected to the opposite ends of an elongated cross-bar. The lower ends of the levers are adapted to engage the two spaced apart clutches for the two separate planter systems in the planter. Pivotal movement of each lever permits selective disengagement of one of the clutches so as to deactuate one-half of the planting system on the planter. The two upper ends of the levers are interconnected by a cross-link which is in turn pivotally connected to a planetary gear which is operatively driven by an electric motor. The gear may be moved in one direction to cause the cross-link to move in a first direction, or the gear may be reversed to cause the cross-link to move in the opposite direction. Thus, it is possible to deactuate one clutch or the other clutch, or to move the crossbar to a neutral central position wherein both clutches are permitted to remain engaged.

The switches for operating the electric motor in the present system are mounted on the tractor so that the farmer can operate the device without leaving the tractor. The device is simple in construction and can be quickly and easily mounted on present planters.

DETAILED DESCRIPTION OF THE PREFERRED EMBODIMENT

Figure 1:
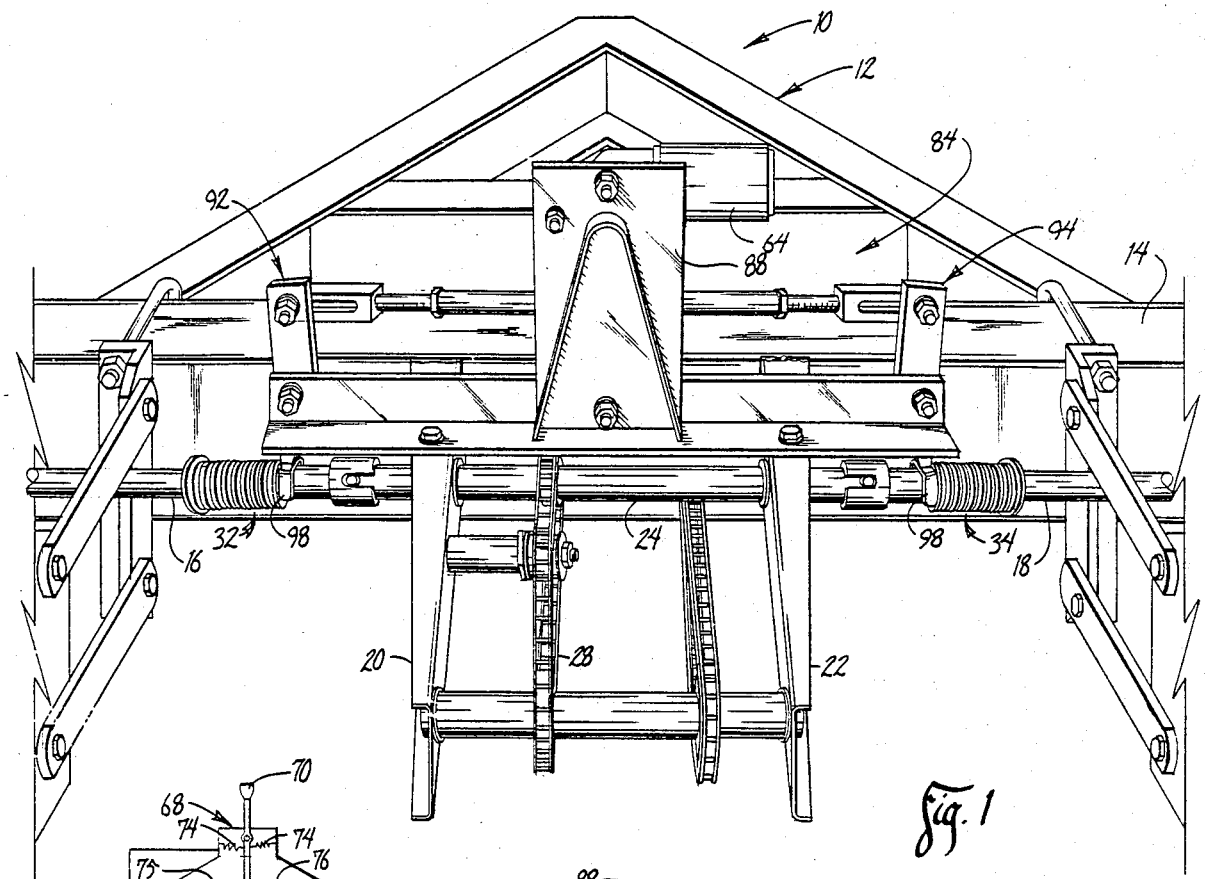
FIG. 1 is a partial rear perspective view of a planter having the present device mounted thereon.

FIG. 1 shows the central portion of a conventional planter having the present invention mounted thereon. The planter is generally designated by the numeral 10, and includes a forwardly extending tongue frame 12 having a horizontally extending bar frame 14 extending across its rearward end. Bar frame 14 supports a plurality of row planters (not shown) in spaced relation across the length thereof. The planters are driven by two separate planter shafts 16, 18, each of which extend across the width of one-half of the planter and each of which are connected to one-half of the row planters. Shaft 16 operates one-half of the row planters and shaft 18 operates the other half of the row planters.

Rotatably mounted within a pair of spaced apart axle frames 20, 22 is a drive shaft 24 having a sprocket 26 thereon which is driven by a chain 28 in conventional fashion. The opposite ends of shaft 24 are provided with radially extending pins 30.

Slidably mounted over ends of shaft 16 and 18 are a pair of clutch assemblies 32, 34. Each clutch assembly is comprised of a sleeve 36 which is slidably fitted over the end of one of shafts 16 or 18. A guide pin 38 extends through sleeve 36 and is slidably received in an elongated slot in the end of shaft 16 and in the end of shaft 18. Sleeve 36 includes an enlarged portion 42 having an axially extending pin slot 44 extending axially inwardly from the end thereof. Enlarged portion 42 is sized to slidably receive the end of drive shaft 24, and slot 44 is adapted to receive pin 30 on shaft 24 so as to lock shaft 24 to shafts 16 and 18. Both sleeves 36 are yieldably urged towards shaft 24 by a spring 78 which is compressed between a stop washer 80 fixed to either shaft 16 or shaft 18 and an end flange 82 on sleeve 36. In order to disengage the connection between shafts 16 or 18 and shaft 24, it is merely necessary to slide sleeve 36 away from shaft 34 against the bias of spring 78 and to rotate sleeve 36 so that slot 44 is out of alignment with pin 30. This disengages the two shafts and has the effect of turning off the planters to which either shaft 16 or shaft 18 are connected.

The foregoing structure is conventional structure found on presently known planters. In the use of these devices, the farmer can disconnect half of the row planters by dismounting from the tractor and disengaging one of the clutches 32, 34. This procedure is desirable when the farmer reaches the edge of the field. If he has an eight row planter, and if there are only four rows left to be planted in the field, he must either shut off four of the row planters or overlap the planters with previously planted rows and double plant those rows.

Instead of double planting, he can dismount from the tractor and disengage one of the clutches so that the planter only plants four rows instead of eight.

Figures 2, 4:
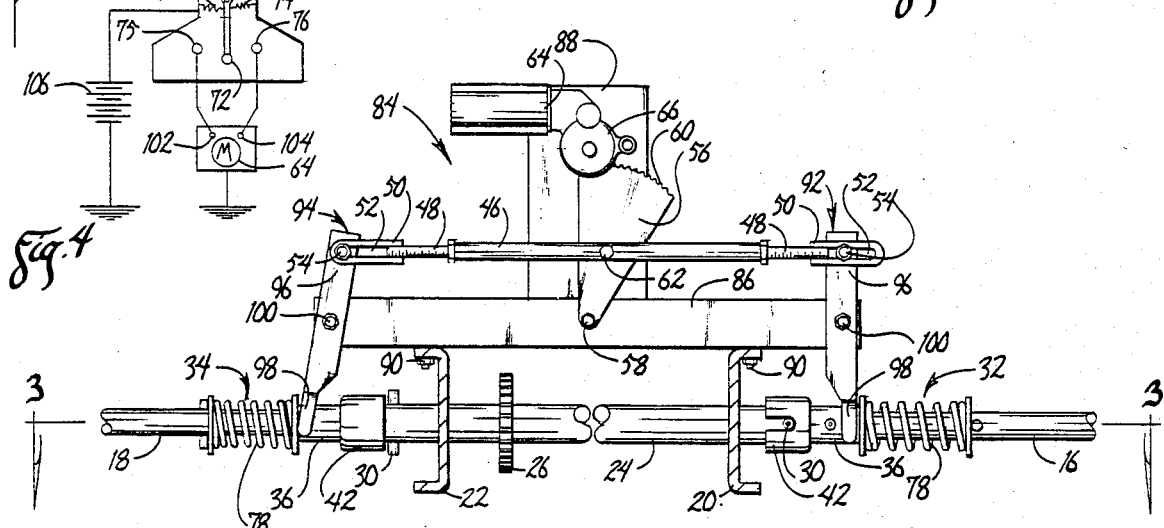
FIG. 2 is an front elevational view of the device shown in FIG. 1.
FIG. 4 is a schematic diagram of the electrical circuitry of the present invention.

The present invention provides means for disengaging either of clutches 32, 34 one at a time without requiring the farmer to dismount from the tractor. The device is shown in FIG. 2 and is designated generally by the numeral 84. Device 84 comprises a T-shaped frame having a horizontal crossbar 86 and an upstanding leg or plate 88, fixed thereto. Crossbar 86 is rigidly secured to the upper edges of axle frames 20, 22 by means of bolts 90.

Figure 3:
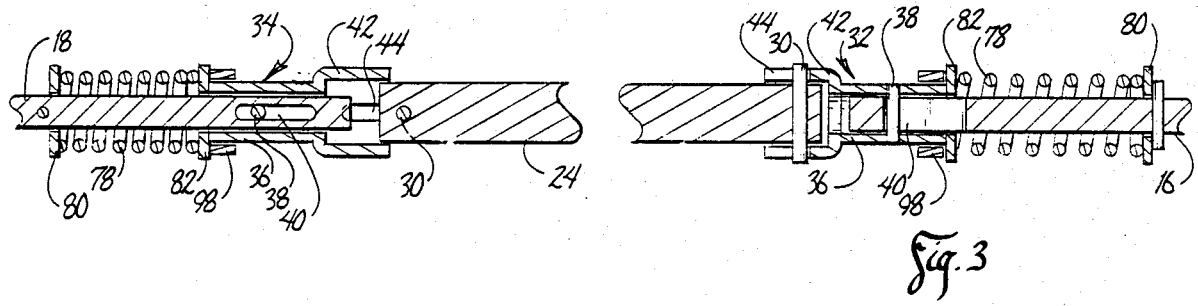
FIG. 3 is a sectional view taken along line 3—3 of FIG. 2.

Pivotally mounted at the opposite ends of crossbar 86 are a pair of levers 92, 94. Each lever 92, 94 includes an upper end 96, a bifurcated yoke 98 at its lower end, and a horizontal pivotal axis 100 at its approximate center. The bifurcated yokes 98 are slidably received over sleeves 36, and engage end flange 82 of sleeve 36. Rotation of lever 94 in a clockwise direction about axis 100 causes yoke 98 to urge sleeve 36 to the left as viewed in FIGS. 2 and 3, thereby disengaging pin 30 from slot 44 of clutch 34. Rotation of lever 92 in a counterclockwise direction causes a similar result with clutch 32. Springs 78 normally urge sleeves 36,36 to their engaged position with pins 30 within slots 44.

A cross link 46 includes threaded portions 48 at its opposite ends. Threadably mounted over each threaded portion 48 is a slot bracket 50 having an elongated closed slot 52 therein. Slot bracket 50 is pivotally secured to the upper end 96 of lever 92 by means of a bolt bushing assembly 54 which is fixed to lever 92 and which extends through slot 52 for sliding movement along the length thereof. A similar bolt bushing 54 pivotally secures the opposite end of link 46 to the upper end 96 of lever 94.

When cross link 46 is moved to the right as shown in FIG. 2, it causes lever 94 to rotate in a clockwise direction so as to disengage clutch 34 and thereby deactuate all of the row planters which are driven by shaft 18. Movement of the cross link 46 in this direction, however, does not cause movement of lever 92 because of the lost motion occurring between bushing 54 and slot 52. When cross link 46 is moved to the left, it causes the clutch 34 to be re-engaged and causes clutch 32 to be disengaged in a manner which is the reverse of that shown in FIG. 2.

A pie-shaped gear segment 56 is pivotally mounted at its lower end to crossbar 86 for pivotal movement about axis 58. The upper end of gear segment 56 includes gear teeth 60 which are arranged in an arcuate surface having its center of curvature at axis 58. A pin 62 pivotally interconnects cross link 46 to gear segment 56 about a pivotal axis which is located between gear teeth 60 and pivotal axis 58 of gear segment 56. Thus, pivotal movement of gear segment 56 in a clockwise direction causes movement of cross link 46 to the right as viewed in FIG. 2, and pivotal movement of gear segment 56 in a counterclockwise direction causes movement of cross link 46 to the left as viewed in FIG. 2. When gear segment 56 is in a vertical upright position, cross link 46 is centered so that both levers 92, 94 are in a substantially vertical position, thereby permitting clutches 32, 34 to be fully engaged.

An electric motor 64 is mounted on plate 88 and includes a gear box 66 having gear teeth drivingly meshed with gear teeth 60 of gear segment 56. Motor 64 is reversible so as to be actuated to move gear segment 60 either in a clockwise or a counterclockwise direction as desired.

Referring to FIG. 4, a remote control box 68 is adapted to be mounted in the cab of the tractor and is adapted to be electrically connected to motor 64. Control box 68 includes an elongated handle 70 having an electrical contact 72 at its lower end. Handle 70 is yieldably held in a center position by means of springs 74. However, handle 70 may be manually rotated so that contact 72 comes within either of two fixed contacts, 75, 76. Contact 75 is electrically connected to a terminal 102 on motor 64 and contact 76 is connected to a terminal 104 on motor 64. Motor 64 is grounded, and handle 70 is connected to a DC power source 106, which may be the battery on the tractor. Movement of contact 72 into electrical engagement with fixed contact 75 causes motor 64 to be actuated in one direction, and movement of contact 72 into engagement with contact 76 causes motor 64 to be actuated in the opposite direction.

When control box 68 is mounted in the tractor, the operator can use lever 70 to move cross link 46 either to the left or right, thereby engaging or disengaging clutches 32, 34 as desired. When it is desired to engage the right hand group of row planters, the operator causes link 46 to be moved to the position shown in FIG. 2, thereby disengaging clutch 34 and deactuating all of the planters driven by shaft 18. If the operator wishes to disengage the row planters driven by shaft 16, he merely moves the lever in the opposite direction until cross link 46 has moved to its extreme left position as viewed in FIG. 2. This disengages clutch 32 and causes clutch 34 to be re-engaged. When the operator desires to have both planters in operation, he merely manipulates handle 70 until gear segment 56 is vertically aligned, and this results in vertical orientation of levers 92 and 94, thereby engaging both clutches 32, 34.

The device is simple and may be mounted upon any conventional planter presently being used. The operator can operate the device within dismounting from the tractor, thereby giving the operator considerably more flexibility than in prior art devices.

The device is simple and economical to manufacture, and it is durable in use. Thus, it can be seen that the device accomplishes at least all of its stated objectives.

What is claimed is:

1. A planter selector device for use with a planter having a planter frame, a plurality of row planters on said frame, a first planter shaft drivingly connected to a first group of said planters and a second planter shaft drivingly connected to a second group of said planters, a drive shaft, power means for rotating said drive shaft, first clutch means movable from an engaged position drivingly connecting said power shaft to said first planter shaft to a disengaged position, second clutch means movable from an engaged position drivingly connecting said power shaft to said second planter shaft to a disengaged position, spring means yieldably urging said first and second clutch means to their engaged positions; said selector device comprising:

first and second actuator links movably connected to said frame, said first and second actuator links each having a pawl engaging one of said first and second clutches and being movable from a first position to a second position to cause said one clutch to move from its said engaged position to its said disengaged position;

selector power means;

control means interconnecting said power means to said first and second actuator links for selectively causing movement of said first and second actuator links one at a time from their first positions to their second positions.

2. A device according to claim 1 wherein said first and second actuator links are pivotally connected to said frame for pivotal movement about first and second spaced apart axes respectively.

3. A device according to claim 2 wherein said control means comprises an elongated control link having opposite ends connecting said opposite ends of said control link to said first and second actuator links, respectively.

4. A device according to claim 3 wherein said first and second connecting means each include lost motion mechanism to permit limited lost motion of said control link with respect to said actuator links.

5. A device according to claim 4 wherein said selector power means is operatively connected to said control link for selectively moving said control link in a first direction to move only said first actuator link from said first position to said second position and for alternatively selectively moving said control link in a second direction to cause said second actuator link to move from its first to its second position.

6. A device according to claim 5 wherein said selector power means comprises a drive motor, a drive gear, and a driven gear, said motor being drivingly connected to said drive gear, said driven gear being attached to said control link, and said drive gear and said driven gear being intermeshed whereby actuation of said motor will cause said drive gear to rotate and cause movement of said control link in said first and second directions.

7. A device according to claim 6 wherein said driven gear is pivotally connected to said frame for pivotal movement about a gear axis and includes an outer peripheral surface having teeth intermeshed with said drive gear, said driven gear being pivotally connected to said control link at a link axis located radially outwardly from said gear axis whereby pivotal movement of said driven gear in a first direction causes movement of said control link in said first direction and pivotal movement of said driven gear in the opposite direction causes movement of said control link in said second direction.

8. A device according to claim 7 wherein said drive gear is selectively reversible.

\* \* \* \* \*